H. KUBOKAWA.
ANIMAL TRAP.
APPLICATION FILED MAR. 12, 1913.
1,097,031.
Patented May 19, 1914.
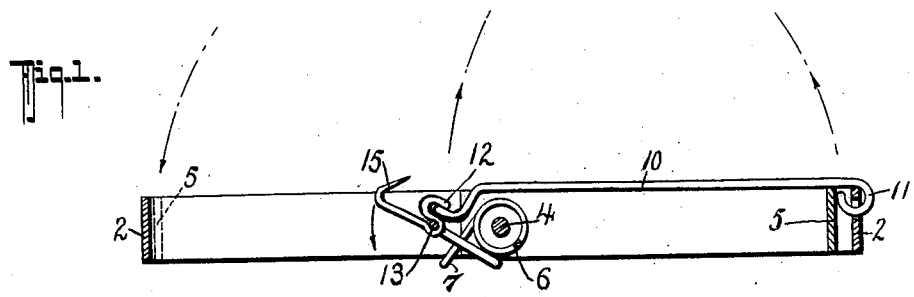
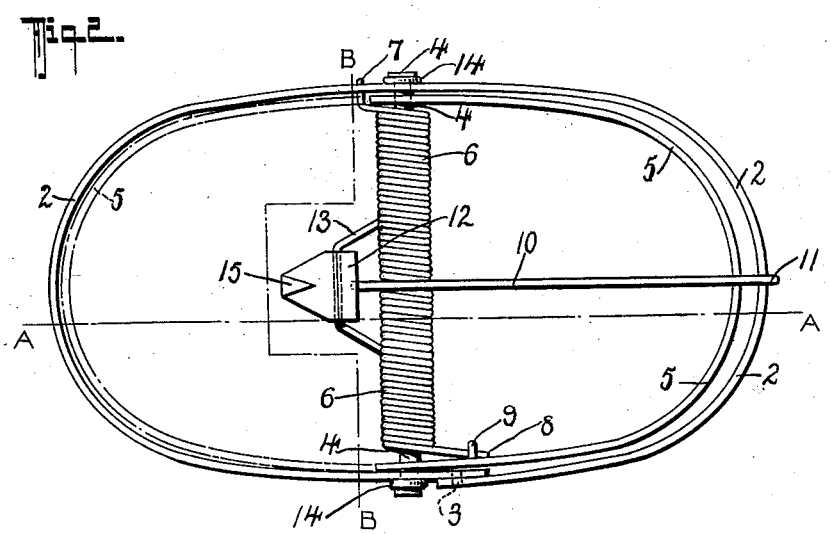
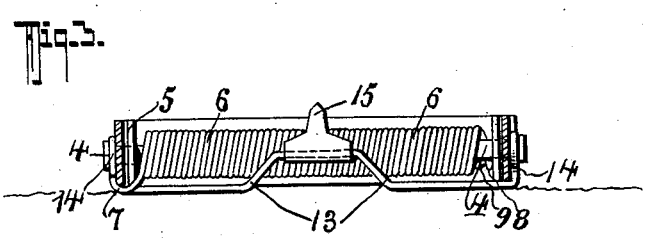
WITNESSES:
Robert M. Greenwell
John J. Schrott
INVENTOR
Haruyoshi Kubokawa
BY
Fred G. Dieterich
ATTORNEY

UNITED STATES PATENT OFFICE.

HARUYOSHI KUBOKAWA, OF VANCOUVER, BRITISH COLUMBIA, CANADA.

ANIMAL-TRAP.

1,097,031.

Specification of Letters Patent. Patented May 19, 1914.

Application filed March 12, 1913. Serial No. 753,787.

*To all whom it may concern:*

Be it known that I, HARUYOSHI KUBOKAWA, a subject of the Emperor of Japan, residing at Vancouver, in the Province of British Columbia, Canada, have invented certain new and useful Improvements in Animal-Traps, of which the following is a specification.

This invention relates to an animal trap which has been particularly designed to catch rats.

The object has been to design a trap which is simple and cheap in both its construction and operation and having a sensitive release connected with the bait hook that will act when any attempt is made to withdraw the bait.

The invention is particularly described in the following specification, reference being made to the drawings by which it is accompanied, in which—

Figure 1 is a longitudinal section on the line A in Fig. 2. Fig. 2, a plan, and Fig. 3, a cross section on the line B in Fig. 2.

The trap comprises a base frame 2 of substantially oval form, which is preferably bent from a strip of thin, flat metal, the ends of which are riveted or otherwise secured at 3, the outer overlapping end being preferably at the "set" end of the trap.

Pivotally mounted on a pin 4 extending across the middle of this frame 2 so as to turn easily within it is a corresponding trap member 5. On the pivot pin 4, within the ends of the trap member 5, is coiled a spring 6, one end 7 of which is anchored to the adjacent underside of the frame 2 and the other end 8, to a projection 9 stamped and inward bent from the trap member 5. The action of this spring 6 is to throw the trap member 5 quickly over from the "set" end of the frame 2 to the other or trapped end, as indicated by the arrow in Fig. 1 and the dot and dash lines.

The trap member 5 is held in the "set" position by a wire 10 loosely pivoted at 11 to one end of the base frame 2 and at the other end bent down to engage an offset 12 from the bait hook 15, which bait hook is formed of thin sheet metal and is mounted to turn easily on a wire 13 extending across the width of the frame 2 and connected at 14 to the pivot pin 4. The particular form of this bait hook 15 and its trigger release 12 form an important feature of this trap. A cautious animal, such as a rat, will endeavor to steal the bait but will seldom attempt to eat it while near the trap.

The hook extends upward and backward from its pivotal mounting on 13 and the offset 12 projects forward on the opposite side of the pivot. A very slight pull on the bait hook will thus withdraw the offset 12 from engagement with the downwardly bent end of the retaining wire 10, and the trap member 5 is released and springs sharply over, as indicated by the arrow to the position shown by the dot and dash lines.

Although the general principle of the action of this trap is similar to others of this class, the differences are directed to improvements in the construction simplifying manufacture and improving its release.

Having now particularly described my invention, I hereby declare that what I claim as new and desire to be protected in by Letters Patent, is:

An animal trap, comprising an open oval frame of strap iron, a pivot passing across said frame at its middle, a U-shape strap iron member mounted at its ends within said frame on said pivot, a spring coiled around said pivot with one end in engagement with said frame and the other end in engagement with said U-shaped member, a long holding wire pivoted to said frame at one end and projecting over said spring, a cross wire having its ends secured by said pivot to said frame and projecting to a place adjacent to said spring, said cross wire having a projecting portion projecting upwardly to a place substantially in horizontal alinement with said pivot, a retaining member pivotally mounted on said projecting portion of said wire, and including a heel portion to engage said holding wire, and a bait hook to receive the bait, the pivotal axis of said retaining member lying about the middle depth of the base frame, and lying with said heel portion above the pivotal axis and said hook above said heel portion, all being arranged substantially as shown and described.

In testimony whereof I affix my signature in presence of two witnesses.

HARUYOSHI KUBOKAWA.

Witnesses:
ROWLAND BRITTAIN,
MAY WHYTE.

Copies of this patent may be obtained for five cents each, by addressing the "Commissioner of Patents, Washington, D. C."